Dec. 12, 1933.   R. B. LONG   1,938,663
RECORDING MACHINE
Filed Aug. 27, 1928   3 Sheets-Sheet 1

INVENTOR.
ROBERT B. LONG.
by H.W. Baker
ATTORNEY.

Dec. 12, 1933.  R. B. LONG  1,938,663
RECORDING MACHINE
Filed Aug. 27, 1928  3 Sheets-Sheet 3
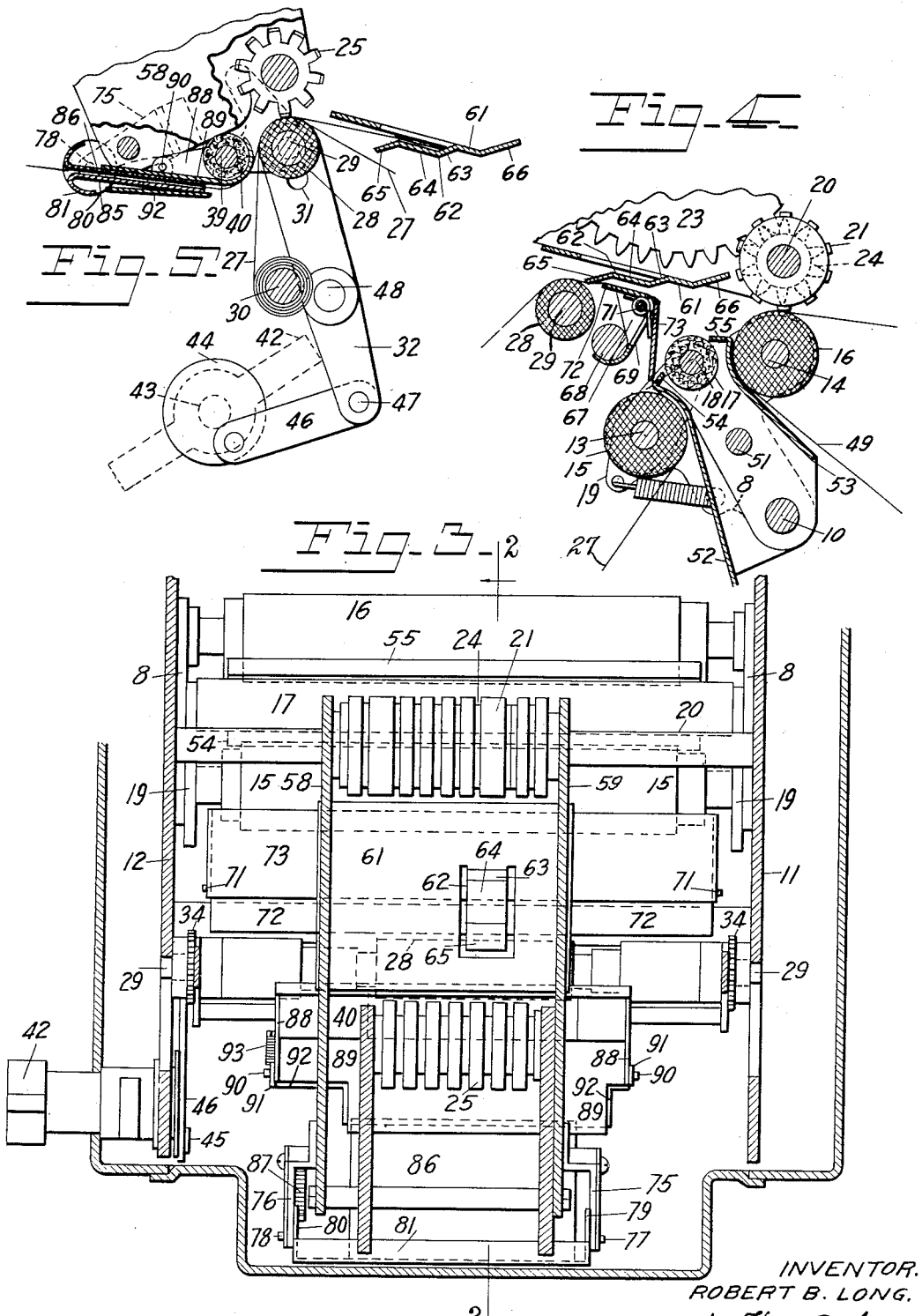
INVENTOR.
ROBERT B. LONG.
by H. W. Baker
ATTORNEY.

Patented Dec. 12, 1933

1,938,663

UNITED STATES PATENT OFFICE 1,938,663

RECORDING MACHINE

Robert B. Long, Dayton, Ohio, assignor to Ohmer Fare Register Company, Dayton, Ohio Application August 27, 1928. Serial No. 302,248

8 Claims. (Cl. 101—66)

This invention is an improvement in recording machines wherein means are provided to guide the record paper when it is being inserted into the machine and means to guide an inserted slip into position so that a record may be made thereon from the totalizer. By way of illustration I have shown the invention as applied to that type of machine disclosed in the patent of Albert S. Wheelbarger and Grover C. Coil, No. 1,868,813, issued May 17, 1932.

In many types of recording machines it has been difficult to thread the record paper through the intricate workings of the machine so that it would be properly positioned. To a large extent this trouble has been caused by the forward end of the paper tending to curl and to impinge against various parts of the machine thereby stopping the forward movement of the record paper so that it was difficult to properly insert the same. The object of this invention is to provide guide means so that these objections are completely overcome.

Numerous machines have been devised in which detail records were printed on the record paper and a total could be printed at the end thereof so that it would resemble a sum in addition with the sum generally printed in a different colored ink. Other machines have been devised whereby a card or slip of paper could be inserted into the machine and a record made thereon from printing wheels. However, so far as known it has not heretofore been possible to use the same printing wheels to print on either the record paper or on an inserted slip. If the printing wheels are to be used to print on a record paper retained within the machine the printing wheels are generally inaccessible to an inserted slip. I have provided means whereby an inserted slip could be guided into printing position so that an impression could be made on either the record strip or on the inserted slip and have provided a guiding means so constructed that the guiding means for the inserted slip will not interfere with the guiding means for the record strip and vice versa.

Another object of the invention is to provide means whereby the inserted slip or card may be properly positioned. This is highly desirable in case the operator desires to take an impression from the totalizer in the morning and another impression from the totalizer at the close of the day, the two impressions being so positioned on the inserted slip that the smaller number may be readily subtracted from the larger number so as to readily obtain the amount of money collected during the day. This is especially advantageous when the machine is used as a cash register and the bookkeeper or the auditor desires to readily obtain the amount of money which should be in the cash drawer. In fact, in small stores this might be the only information desired, in which case the record strip might, therefore, be omitted.

Referring more in detail to the drawings,

Fig. 3 is a plan view on the line 3—3 of Fig. 2.

Fig. 4 is a cross-sectional elevational view showing the position of certain of the parts in operated position, and Fig. 5 is an elevational view partly in cross-section of the total printing mechanism while being operated.

Figure 1:
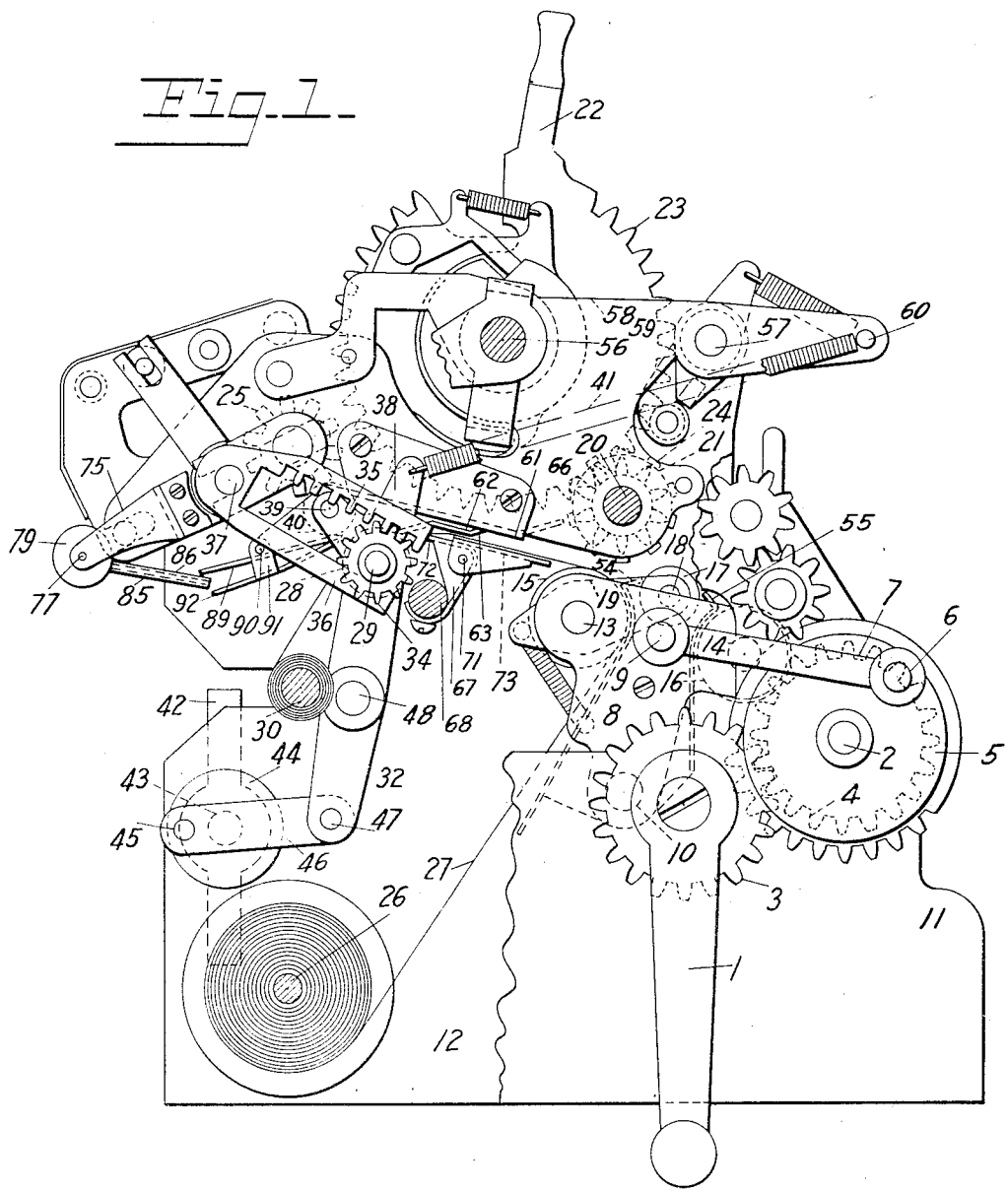
Fig. 1 is an elevational view of the operating side of the machine with the casing partly broken away to more clearly indicate the interior mechanism thereof.

The machine is operated by a crank handle 1 or by an electric motor (not shown), which rotates the shaft 2 through gears 3 and 4. Secured to the gear 4 and to the shaft 2 is a disk 5 which carries a wrist pin 6 which operates a pitman 7 which oscillates a printing carrier 8 being connected thereto by a wrist pin 9. The printing carrier 8 is mounted on a rod 10 which is supported by the left sidewall 11 and the right sidewall 12 of the machine. The oscillating printing carrier 8 carries shafts 13 and 14 on which are mounted platens 15 and 16 respectively. An ink roller 17 is mounted on a shaft 18 carried by levers 19 journaled on the shaft 13. The rod 10 is directly below a shaft 20 on which shaft are mounted detail printing wheels 21, each of which wheels is set up by means of a lever 22 secured to a gear 23 which meshes with a pinion 24 secured to its respective type wheel. All of this mechanism is fully shown and described in the said patent of Albert S. Wheelbarger and Grover C. Coil.

The totalizer printing wheels 25 accumulate the sum of all the detail numbers representing cash taken in. The method of actuating the totalizer printing wheels forms no part of the present invention and is fully shown and described in the patent of Albert S. Wheelbarger and Grover C. Coil, No. 1,876,118, issued September 6, 1932.

The record roll is mounted on a shaft 26 from which the record paper 27 passes over the platen 15 and a platen 28 mounted on a shaft 29, and is wound onto a record receiving shaft 30.

The shaft 29 is mounted in a slot 31 in the lever 32 and in slots 33 of the sidewalls 11 and 12. The shaft 29 also carries pinions 34 which mesh with a rack 35 and are held in mesh with the rack by means of guide arms 36, which lie beneath the shaft 29. The rack 35 and guide arm 36 may be made in one piece and pivoted on a shaft 37. Loosely mounted on the shaft 29 are bell crank levers 38, which levers carry a shaft 39 on which is mounted an ink roller 40 for the totalizer. A spring 41 holds the bell crank lever in such a position that the ink roller will be brought into contact with the totalizer printing wheels when the totalizer printing mechanism is operated.

Figure 2:
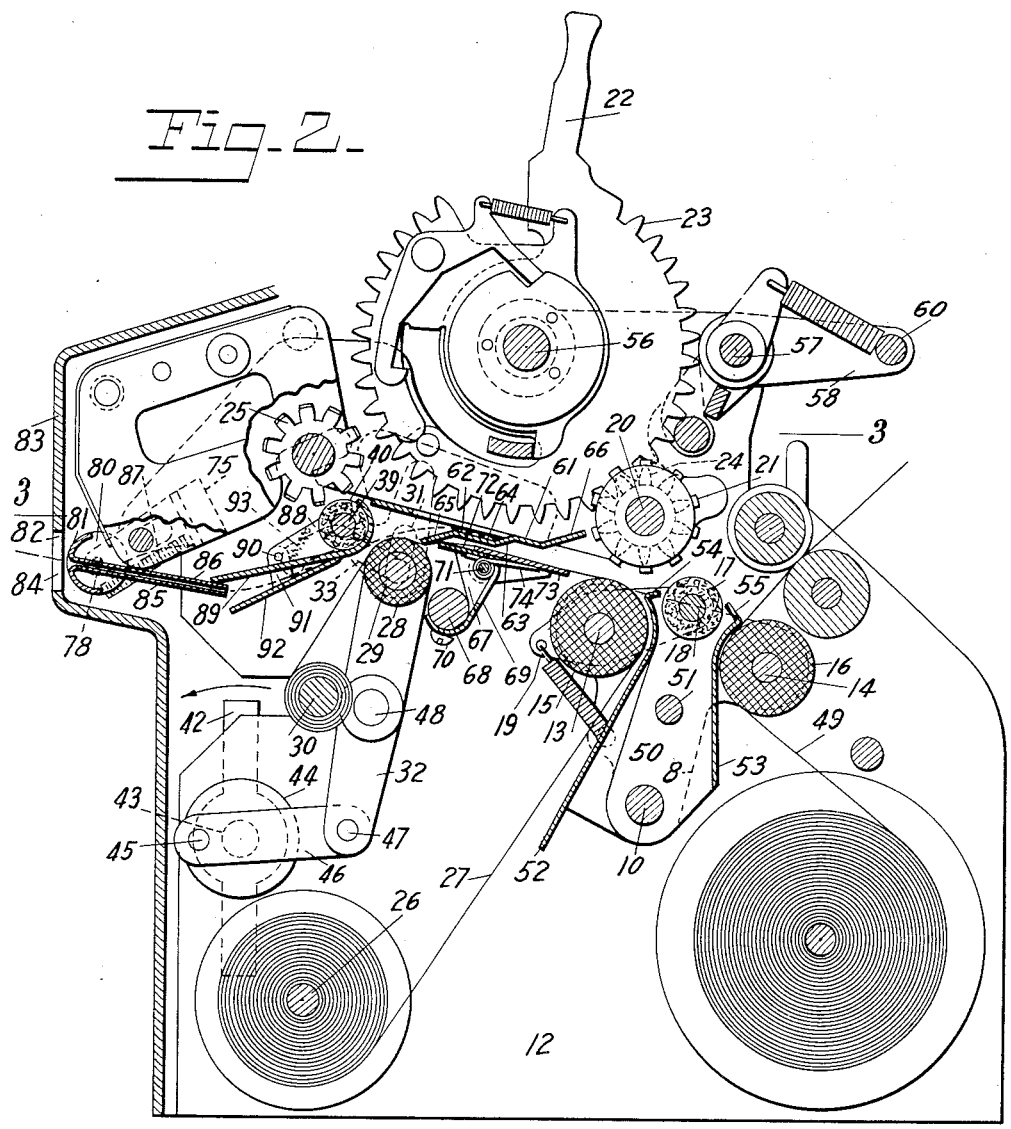
Fig. 2 is an elevational cross-sectional view on the line 2—2 of Fig. 3, looking in the direction of the arrows.

The totalizer printing mechanism is operated by rotating the hand crank 42 in the direction of the arrows shown in Fig. 2, which hand crank is rigidly secured on a stud shaft 43 to which is secured a disk 44 which carries a wrist pin 45 which actuates a pitman 46 which is secured to the lower end of the lever 32 by means of a pin 47. The lever 32 is mounted on a stud pin 48. It is obvious that if the hand crank 42 is rotated the totalizer wheels are first inked and thereafter the record paper is brought into contact with the totalizer printing wheels and then the parts are moved back to their normal position as shown in Figs. 1 and 2. The method of taking the impression from the totalizer printing forms no part of this invention and is fully shown and described in the said patent of Wheelbarger & Coil No. 1,876,118.

A guide unit is provided to guard both the record paper 27 and the ticket paper 49 over their respective platens 15 and 16. This guard consists of side plates 50 mounted on the rod 10 and a tie rod 51 carried by the opposite sidewalls of the printing carrier 8. Connecting the side plates 50 are plates 52 and 53. These plates gradually diverge from each other in their lower extremities and in their upper parts form arcs concentric with their respective platens and above the arc portions extend upwardly and toward the upper part of the ink roller 17 thereby forming ink guards 54 and 55 respectively. With such a construction the paper may be placed against its guard and pushed upwardly and the guard and the platen will guide the upper end of the paper so that it cannot get out of position. The ink guards 54 and 55 prevent the paper from coming into contact with the ink roller when the printing carrier is oscillated to, for instance, the position shown in Fig. 4.

The upper part of the machine is provided with the said shaft 37, a shaft 56 and a shaft 57, all of which shafts are stationary. On these are mounted two side plates 58 and 59, which side plates are connected by a tie rod 60. On the lower center part of the side plates 58 and 59 is a guide plate 61 having a depending tongue 62. The tongue 62 is integral with the bottom of the guide plate 61 but on its sides and forward end a strip has been cut out as is clearly shown in Fig. 3. The tongue 62 extends from the bottom of the guide plate 61 first downwardly and forwardly forming a sloping surface 63, forwardly and substantially parallel to the bottom of the guide plate 61 forming a surface 64 and then downwardly and forwardly forming a sloping surface 65. The rear end of the guide plate 61 extends upwardly and rearwardly forming a sloping surface 66.

Beneath the guide plate 61 is another guide unit consisting of side plates 67 and a connecting plate 69 extending around the lower portion of a rod 68, which rod is mounted in the sidewalls of the machine. The connecting plate 69 may be secured to the rod 68 by any conventional means such as by screws 70. The side plates 67 carry a rod 71 and the connecting plate 69 extends around the upper portion of the rod 71 and forwardly forming a guide surface 72 substantially parallel with the surface 64. A guide plate 73 is pivotally mounted on the shaft 71 and its forward end extends for some distance over the surface 72 so that its upward movement is limited thereby. It is normally held in this position by means of a spring 74. When, however, the machine is operated from the position shown in Figs. 1 and 2 to the position shown in Fig. 4 the guide plate 73 will be moved by the record paper downwardly and will pass in between the upper end of the guide plate 52 and the platen 15. If the guide plate 73 would not thus yield, the paper would be torn when being moved into the position shown in Fig. 4. When the machine is being moved from the position shown in Fig. 4 to that shown in Fig. 2 the spring 74 will return the plate 73 and the record paper to their normal positions.

When the record paper is being inserted the operator presses the upper end thereof against the guide plate 52 and feeds it forwardly with his fingers causing it to follow the arcuate upper end of the guide which will turn the upper end of the paper beneath the detail printing wheels 21. The rear ends of the guide plates 61 and 73 form a flaring opening which will receive the forward end of the record paper and will guide it forwardly beneath the tongue 62 and over the platen 28 so that it can be readily grasped by the hand of the operator and anchored on the shaft 30.

At the forward ends of the side plates 58 and 59 are secured arms 75 and 76 which carry pins 77 and 78 respectively, on which pins are journaled circular plates 79 and 80 respectively which are connected by an arcuate plate 81. The plate 81 is positioned directly behind an opening 82 in the front wall 83 of the machine. The plate 81 is provided with an aperture 84 and extending inwardly from the aperture and connected to the arcuate plate 81 are spaced guide plates 85 and 86. The circular plate 80 is connected to a spring 87 which is connected to a fixed part of the machine such as the arm 76 and tends to hold the guides 85 and 86 in the position shown in Fig. 2.

Loosely mounted on the shaft 39 are side arms 88 and connecting the side arms 88 is a guide plate 89, best shown in Figs. 2 and 5. The plate 89 has its forward end normally resting on the upper portion of the guide plate 86 and extends rearwardly and around the ink roller 40. This construction prevents the record paper being fed against the ink roller when the record paper is being inserted. At the forward end of the arms 88 are pins 90 which extend through side arms 91 on the lower portion of which is mounted a guide plate 92. A spring 93 connects one of the side arms 91 with one of the side arms 88 so as to normally hold the pivoted guide plate 92 in the position shown in Fig. 2 so that the rear portion of the guide plate 92 will abut against the lower portion of the guide 89. This construction prevents the record paper being fed above the guide plate 92 and assures that it will be fed beneath it. The rear end of the plates 86 and 85 extend between the forward end of the plates 89 and 92. When it is desired to insert a strip or card to receive an impression from the totalizer it is fed through the opening 82 and between the guide plates 85 and 86. It then passes beneath the guide plate 89 and above the guide plate 92. The spring 93 is very weak and the paper presses the rear extremity of the plate 92 away from the rear portion of the guide plate 89 so that the paper now passes above the platen 28 and it is then received by the sloping surface 65 and guided into position so that it is stopped when it reaches the point where the tongue meets the body part of the guide plate 61. The total impression may now be made on the inserted slip and not made on the record paper. If it is desired to make an impression in the morning and again at the close of the day so that one impression will be slightly above the other, as is normally the case in subtraction, it is necessary to pull the card backward for one of the impressions a short distance, which can very easily be done.

Normally the position of the parts are as shown in Figs. 1 and 2 but when the total impression is taken the guide plates 89 and 92 would be moved forwardly into the position shown in Fig. 5 for these parts move with the lever 32.

It is, therefore, obvious that with this improved construction a very efficient guide means is provided for the record paper and also for the inserted strip, and the parts have been so arranged that none of the guiding means interfere with any of the other guiding means.

It is obvious that many changes may be made in the specific form of the invention shown in this application and I desire to reserve to myself the right to make all changes which may fairly fall within the scope of the appended claims and irrespective of the type of machine on which the invention may be incorporated.

Having described my invention, I claim—

1. In a recording machine, printing wheels, means whereby a record sheet may be guided into proper position relative to said printing wheels, means whereby an inserted strip may be guided into proper position relative to said printing wheels and a deflecting plate forming a part of said last mentioned means to prevent the record sheet being fed into said last mentioned means.

2. In a recording machine, printing wheels, means whereby a record strip may be guided into position relative to said printing wheels, and means consisting in part of a plurality of telescoping guides whereby an inserted strip may be guided between said record strip and said printing wheels.

3. In a recording machine, printing wheels, an inking roller therefor, a platen, and means consisting in part of a plurality of telescoping guides whereby an inserted strip may be guided between said inking roller and platen and into proper printing position.

4. In a recording machine, printing wheels, an inking roller therefor, a platen, means consisting in part of a plurality of telescoping guides whereby an inserted strip may be guided between said inking roller and platen and into proper printing position, and means whereby said inserted strip is stopped when it has been correctly positioned.

5. In a recording machine, guiding means for an inserted slip, said guiding means including a plurality of pivoted guides, means whereby said slip is arrested when it has been correctly positioned, and means to hold the slip in its adjusted position.

6. In a recording machine, guiding means consisting in part of a plurality of telescoping guides for an inserted strip, a plate forming a part of said guiding means, a tongue projecting from said plate, said tongue serving as a means to guide said strip and to arrest it in adjusted position.

7. In a machine, a pivoted guide, a second pivoted guide extending partly within the first mentioned guide, each of said guides being provided with communicating channels, and means to oscillate both of said guides on their axes.

8. In a machine, a plurality of telescoping guides each of which is provided with a channel, means to advance one of said guides towards the other of said guides, and means to oscillate both of said guides.

ROBERT B. LONG.